United States Patent
Giolvas

[11] Patent Number: 5,873,371
[45] Date of Patent: Feb. 23, 1999

[54] METHOD AND APPARATUS FOR THE REMOVAL OF HARMFUL CONSTITUENTS FROM CIGARETTES AND TOBACCO BEFORE SMOKING

[76] Inventor: George Giolvas, 20 Dimitriouralli Street, Agia Paraskevi, GR-153 Athens, Greece

[21] Appl. No.: 930,683
[22] PCT Filed: Mar. 22, 1996
[86] PCT No.: PCT/GR96/00008
  § 371 Date: Sep. 30, 1997
  § 102(e) Date: Sep. 30, 1997
[87] PCT Pub. No.: WO96/31255
  PCT Pub. Date: Oct. 10, 1996

[30] Foreign Application Priority Data

Apr. 7, 1995 [GB] United Kingdom ............... 950100143

[51] Int. Cl.[6] .................................................. A24B 15/24
[52] U.S. Cl. .................. 131/297; 131/296; 250/493.1; 422/22
[58] Field of Search ..................... 131/296, 297; 356/246, 440; 250/493.1, 405 R; 422/22

[56] References Cited

U.S. PATENT DOCUMENTS

| | | | |
|---|---|---|---|
| 3,851,653 | 12/1974 | Rosen | 131/17 A |
| 3,863,645 | 2/1975 | Tso | 131/140 P |
| 4,018,233 | 4/1977 | Miyake | 131/17 AC |
| 4,177,576 | 12/1979 | Psaras | 34/33 |
| 4,182,743 | 1/1980 | Rainev et al. | 422/211 |
| 4,248,252 | 2/1981 | Lendvay et al. | 131/140 P |
| 4,250,901 | 2/1981 | Yamaguchi | 131/17 AC |
| 4,388,933 | 6/1983 | Norman et al. | 131/293 |
| 5,016,655 | 5/1991 | Waddell et al. | 131/334 |
| 5,211,252 | 5/1993 | Henderson et al. | 177/25.14 |
| 5,731,275 | 3/1998 | Prevost et al. | 510/161 |

FOREIGN PATENT DOCUMENTS

| | | |
|---|---|---|
| 2 272 612 | 12/1975 | France . |
| 2 015 317 | 9/1979 | United Kingdom . |
| WO 87 07478 | 12/1987 | WIPO . |
| WO 90 03124 | 4/1990 | WIPO . |

OTHER PUBLICATIONS

Chemical Abstracts, vol. 80, No. 9, 4 Mar. 1974, Columbus, Ohio; Abs. No. 45796.
Chemical Abstracts, vol. 94, No. 15, 13 Apr. 1981, Columbus Ohio; Abs. No. 118063.
Database WPI, Section Ch, Week 8046, Derwent Publications, Ltd. London, GB.

*Primary Examiner*—John G. Weiss
*Assistant Examiner*—Charles W. Anderson
*Attorney, Agent, or Firm*—Herbert Dubno

[57] ABSTRACT

An apparatus for receiving harmful substances from a cigarette includes a heating chamber provided with a heating element heating a treating solution consisting of 75% alcohol and 25% of hydrogen peroxide so that the latter evaporates and by transversing the cigarette, carries away the harmful substances from the chamber.

10 Claims, 2 Drawing Sheets

METHOD AND APPARATUS FOR THE REMOVAL OF HARMFUL CONSTITUENTS FROM CIGARETTES AND TOBACCO BEFORE SMOKING

CROSS REFERENCE TO RELATED APPLICATIONS

This is a national phase application base on PCT/GR96/00008 filed 22 Mar. 1996 and based in turn, on greek Application 950100143 filed 7 Apr. 1995 under the International convention.

FIELD OF THE INVENTION

The present invention describes a method and apparatus for the removal of harmful constituents from cigarettes by simultaneously heating the cigarettes and a fluid which evaporates and thereby carries away the harmful constituents of the cigarettes, cigarette paper and tobaccos.

BACKGROUND OF THE INVENTION

It is well known that cigarettes contain, amongst other things, nicotine and tar as well as nitric acid from the impregnation of thee cigarette paper. Recent statistical studies regarding smoking and the incidence of cancer, as well as other well known studies on the general adverse effects of cigarettes on human health, such as, the formation of carbon monoxide, have forced the tobacco producing companies to display a health warning sign on all their advertisements, as well as on the cigarette packs themselves and in many countries have led to the banning of smoking in closed public places.

In order to reduce the concentration of harmful constituents in cigarettes, tobacco industries have produced extra light cigarettes with lower content in tar and nicotine. Special filters have also been manufactured in the form of smoking pipes for controlling tar. Other filters with many small holes have also been used. Such efforts have however led to considerable reduction of the pleasure associated with smoking.

Various methods are disclosed in the prior art for treating tobacco or tobacco leaves, with the purpose of decreasing nicotine content and/or conditioning tobacco, i.e. expanding the same to render it suitable for use. Such methods are for example disclosed in Chemical Abstracts, vol. 80, No. 9, Abstract 45796 or Chemical Abstracts, Vol. 94, no. 15, Abstract 118063 or JP-A-551279 80 (WPI/DERWENT) Abstract AN-80-81756C or FR-A-2 272 612 or U.S. Pat. No. 4,388,933), wherein variations of heat treatment with $H_2O_2$ is proposed, however relating only to tobacco, tobacco leaves or rolled and cut tobacco stems.

Alternatively WO-A-0/03124 proposes a device for the otherwise conventional steam treatment of tobacco, in particular it proposes a treatment of a movable, vibrating stream of tobacco particles by means of steam. Eventually, both U.S. Pat. No. 4,388,933 and SU-A-799714 make reference to treating tobacco with infrared light with a view of drying and expanding the same.

With the exemption of WO-A-90/03124, none of the above cited references discloses a particular apparatus for treatment of tobacco products. However, the apparatus disclosed in WO-A-90/03124 relates to a movable and vibrated stream of tobacco particles, being treated by steam passing therethrough and has no structural or functional resemblance to the apparatus disclosed in the present invention wherein, besides other things, a quite extended period of time of tobacco products exposure is necessary to allow interaction of vapors of the working liquid and infrared radiation with tobacco. Moreover, the disclosed methods of treatment relate only to tobacco or tobacco leaves or rolled and cut tobacco stems still within the phase of their treatment at an industrial scale and in no way do they make any reference to treatment of ready made cigarettes or tobacco.

Thus, all the above methods and related products being made available by industry itself do not allow the possibility for the end user—the smoker—to proceed with treatment of the cigarettes or tobacco he buys in order to remove harmful constituents thereof before smoking. Moreover, the success rate in retention of harmful constituents using the methods of the prior art has proven frustrating and ineffective.

OBJECT OF THE INVENTION

It is therefore the object of the present invention to eliminate drawbacks of the prior art and provide a method and means for the smoker, end user of cigarettes or tobacco products to individually proceed with treatment of the cigarettes or tobacco he buys, irrespective of the type or prior treatment of these cigarettes or tobacco, in order to efficiently and completely remove harmful constituents thereof and thereby ensure an adequate self protection of health.

SUMMARY OF THE INVENTION

The apparatus and method proposed in the present invention makes it possible for an individual to treat ready made cigarettes or tobacco by subjecting them to the combined exposure to infrared radiation and to treatment with the vapors of a liquid or a preferable composition of about 75% alcohol (92°) and about 25% hydrogen peroxide ($H_2O_2$) to effect complete removal of harmful constituents from cigarettes or tobacco, without however resulting in any adverse smoking pleasure reduction, such as loss of flavor of the same.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
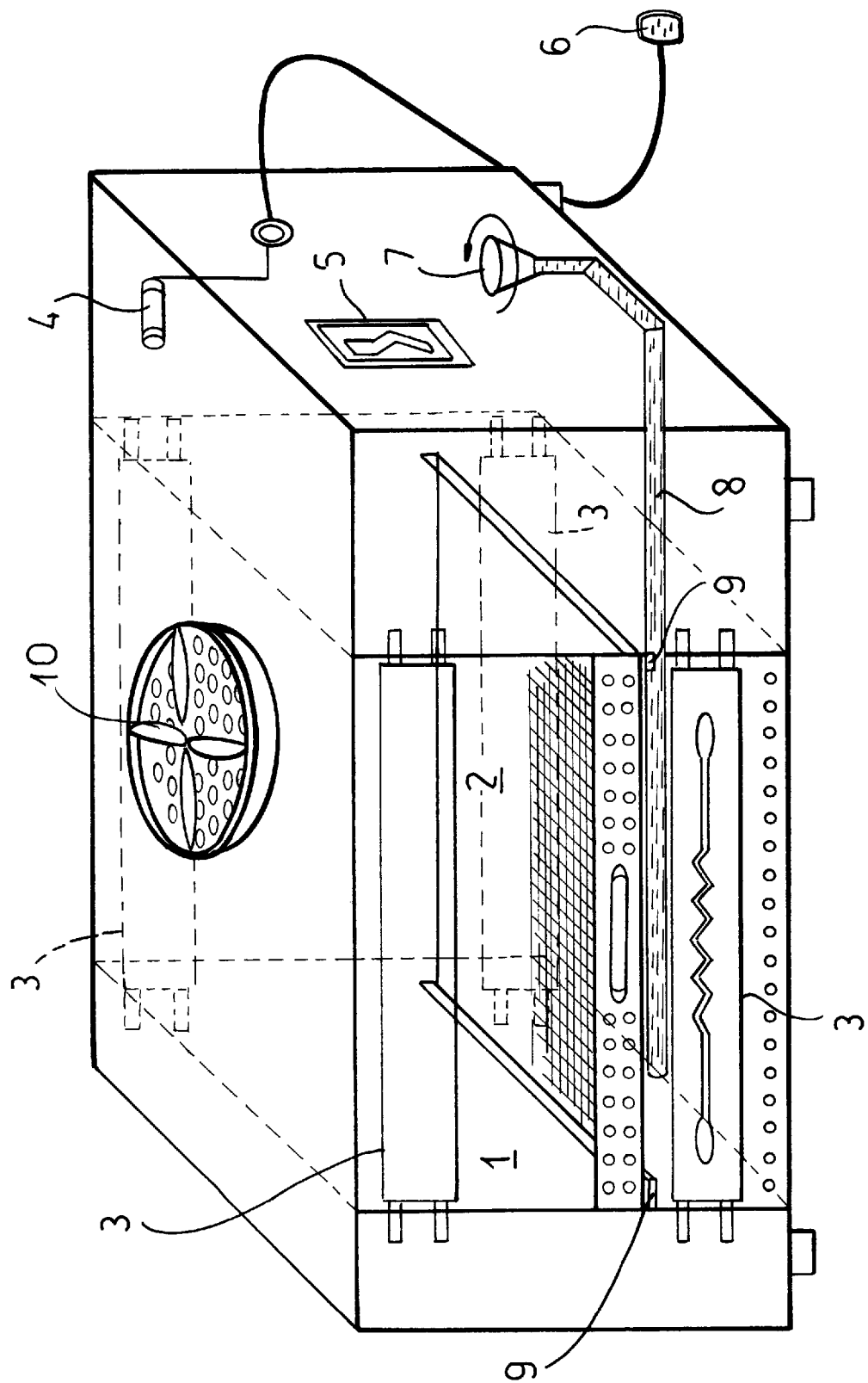
FIG. 1 is a complete set up of the apparatus.
Figure 2:
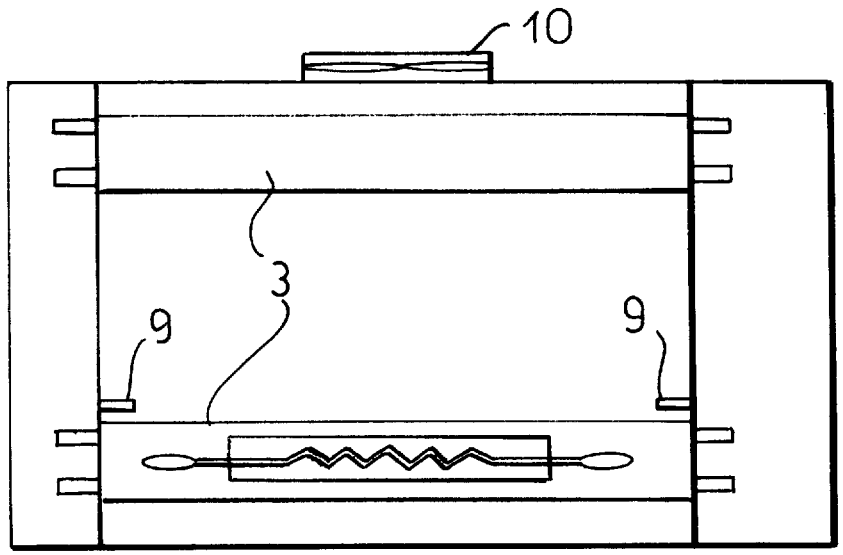
FIG. 2 is a front view of the apparatus.
Figure 3:
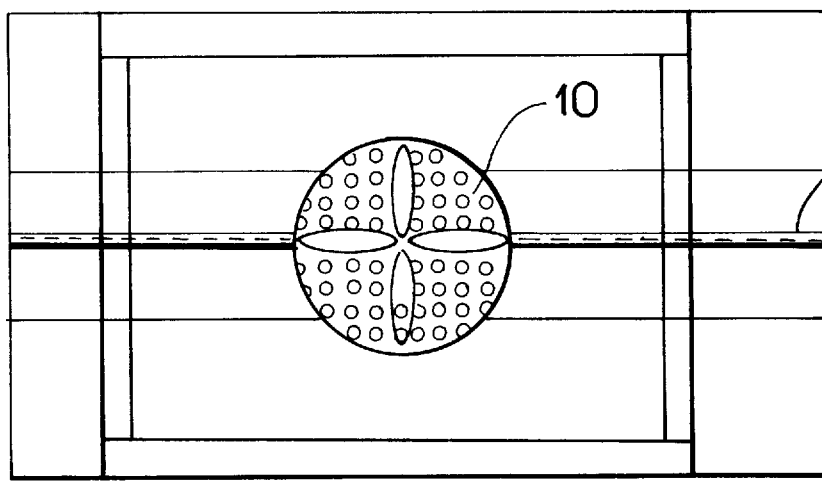
FIG. 3 is a top view of the apparatus.

In accordance to a preferred embodiment, as shown in FIG. 1 the apparatus of the invention comprises a heating chamber 1 with a removable cigarette or tobacco holder means 2, which is slidable along guides 9, fixedly mounted within the heating chamber 1. A container duct mean 8 is provided underneath cigarette or tobacco holder means 2 and extends to a funnel means 7, which is used for topping up the level of the liquid used for treatment of the cigarettes/tobacco in the container duct means 8. An arrangement of infrared heating lamps 3 is used at desirable locations above and below the cigarette/tobacco holder means 2, whereas means for heating the chamber and particularly for heating and evaporating the liquid within container duct means 8 can be selected from any available different heating element means, such as resistors, infrared or other special heat emitting lamps. An electrical power supply means for the abovementioned means for heating and infrared beating lamps comprises a mains voltage source 6, wiring 4 and switch means 5. A flow stream of the evaporating liquid is created by means of a suction means, such as a small exhaust fan 10 conveniently mounted at an opening of the apparatus, which opening is covered by a perforated disc to allow discharge of the evaporating liquid carrying with it the removed harmful constituents of cigarettes/tobacco out of the apparatus.

Figure 4:
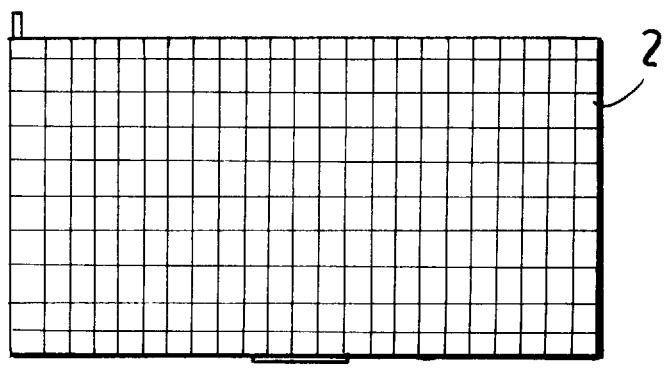
FIG. 4 is a top surface of a cigarette holder.

To use the apparatus, the cigarette holder 2 having a top surface seen in FIG. 4 is removed from the chamber 1, and the cigarettes are placed in the holder, with their filter facing the front side of the apparatus. The holder is placed inside the chamber 1. By using the mains voltage source 6 and turning on the switch 5, infrared heating lamps 3 and other means for heating the chamber, are turned on and the fluid in the duct container means a starts to heat up. The cigarettes or the tobacco in the heating chamber are also heated up being subjected to infrared radiation. The special fluid, which has a preferable composition with main constituent parts about 75% alcohol (92°) and about 25% hydrogen peroxide ($H_2O_2$), when heated evaporates, and in doing so carries away from the cigarettes or the tobacco the harmful constituents, after having passed axially therethrough. Finally, after some time the apparatus is switched off via switch 5 and the cigarette holder 2 is removed with the cigarettes or tobacco ready for use free of harmful constituents, and without loss of flavor.

What is claimed:

1. A method for removal of harmful constituents from cigarettes comprising the steps of:
    (a) placing at least one cigarette extending along a longitudinal axis on a stationary surface in a closed chamber;
    (b) filling a container located in said chamber under the stationary surface with a solution including 75% of alchol and 25% of hydrogen peroxide;
    (c) heating said solution and said cigarette in said chamber, thereby evaporating said solution to generate a flow stream; and
    (d) directing said flow stream to traverse the cigarette in a direction parallel to the longitudinal axis of the cigarette, thus carrying away harmful constituents from the cigarette.

2. The method defined in claim 1 wherein said heating is effected by heating means for heating said chamber selected from a group consisting of electrical devices and electronic devices.

3. The method defined in claim 1 further comprising a step of treating the cigarette by infrared radiation generated by infrared lamps.

4. The method defined in claim 1 wherein direction of the stream flow is effected upon turning on of an exhaust fan mounted in said chamber.

5. An apparatus for removing the substances from a cigarette comprising:
    a heating chamber having a longitudinal axis;
    reservoir means for collecting a treatment solution including 75% of alcohol and 25% of hydrogen peroxide in said chamber;
    funnel means in flow communication with said reservoir means for controlling a level of filling of said reservoir means;
    infrared means for generating infrared radiation in said chamber;
    holder means above said reservoir means for holding at least one elongated cigarette to be treated by said infrared means and extending along the longitudinal axis of the heating chamber and placed on a removably slidable tray in said chamber;
    heating means in said chamber for evaporating said treatment solution, thus generating a flow stream; and
    evacuating means for directing said flow stream to traverse said cigarette parallel to the longitudinal axis and for evacuating the flow stream contaminated with the harmful substances upon crossing of the cigarette from the chamber.

6. The apparatus defined in claim 5 wherein the infrared means includes a plurality of infrared lamps located below and above the holding means.

7. The apparatus defined in claim 5 further comprising supply means for supplying electrical power to said heating and infrared means.

8. The apparatus defined in claim 7 wherein the supply means includes a voltage source and a switch.

9. The apparatus defined in claim 5 wherein the evacuating means includes a fan mounted on a perforated disc covering an opening formed on said chamber.

10. The apparatus defined in claim 5 wherein said heating means is selected from the group consisting of electrical and electronic devices.

\* \* \* \* \*